(12) United States Patent
Nakagawa et al.

(10) Patent No.: US 11,913,503 B2
(45) Date of Patent: Feb. 27, 2024

(54) CAM CLUTCH

(71) Applicant: TSUBAKIMOTO CHAIN CO., Osaka (JP)

(72) Inventors: Eiichi Nakagawa, Osaka (JP); Tsubasa Sugiya, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/135,998

(22) Filed: Apr. 18, 2023

(65) Prior Publication Data

US 2023/0366438 A1    Nov. 16, 2023

(30) Foreign Application Priority Data

May 10, 2022  (JP) ................. 2022-077724

(51) Int. Cl.
*F16D 41/08* (2006.01)
*F16D 41/07* (2006.01)

(52) U.S. Cl.
CPC ........... *F16D 41/07* (2013.01); *F16D 41/073* (2013.01); *F16D 41/084* (2013.01); *F16D 41/088* (2013.01)

(58) Field of Classification Search
CPC .................................................. F16D 41/084
See application file for complete search history.

(56) References Cited

U.S. PATENT DOCUMENTS

| | | | | |
|---|---|---|---|---|
| 5,343,992 | A * | 9/1994 | Stark | F16D 41/061 192/93 C |
| 2013/0319811 | A1* | 12/2013 | Kato | F16D 41/084 192/45.1 |
| 2014/0202821 | A1* | 7/2014 | Schotten | F16D 41/084 192/45.1 |
| 2022/0056963 | A1 | 2/2022 | Nakagawa et al. | |

FOREIGN PATENT DOCUMENTS

JP          6882699 B2     6/2021

* cited by examiner

*Primary Examiner* — Timothy Hannon
(74) *Attorney, Agent, or Firm* — WHDA, LLP

(57) ABSTRACT

To provide a simple-structured cam clutch that does not require precise control and is operable with a smaller drive force and less prone to damage on cam surfaces or inner and outer raceways. The cam clutch includes a plurality of cams circumferentially arranged between an inner race and an outer race and supported by a cage member, and a selector capable of changing an orientation of the cams. The selector includes a driven part allowing a rotation angle thereof to be controlled relative to the inner race or outer race to which the cage member is fixedly attached, and a selector body circumferentially displaceable relative to the driven part in a resilient manner by a spring-loaded mechanism. The selector body includes a cam orientation control protrusion capable of changing the orientation of the cams by making contact with the cams.

5 Claims, 5 Drawing Sheets

CAM CLUTCH

BACKGROUND OF THE INVENTION

1. Field of the Invention

The present invention relates to a cam clutch configured to be switchable between a free mode that allows relative rotation between an outer race and an inner race and a locked mode that prohibits relative rotation between the outer race and the inner race.

2. Description of the Related Art

Clutches control torque transmission and interruption by switching between a locked mode that prohibits relative rotation between the inner race and the outer race (transmits torque) and a free mode that allows relative rotation between the inner race and the outer race (interrupts torque). Some clutches known as cam clutches are switched between the locked mode and the free mode by forced change of the orientation of cams or sprags.

Japanese Patent No. 6882699, for example, discloses a cam clutch having a plurality of cams circumferentially arranged between the inner race and the outer race and a cam orientation changing part that includes a plurality of pin members as the means of forcing the cams to tilt. The pin members press one side face of the cams in the circumferential direction by moving in the circumferential direction relative to the cams to forcibly change the cam orientation.

SUMMARY OF THE INVENTION

These cam clutches require a large drive force when switching from the locked mode to the free mode to change the orientation of cams with ongoing torque transmission by the cams, and the switching performed during torque transmission could overload the drive source.

Moreover, the mechanism for changing the cam orientation and the actuator needed to be made large in accordance with the drive force, and the raceways of the inner and outer races could suffer damage.

The cam clutch known from Japanese Patent No. 6882699 is highly responsive and can provide a desired torque capacity. With the pin members located away from the pivot point of the pins, a relatively large drive force can be generated for changing the cam orientation. On the other hand, the pins need to be positioned precisely relative to each other, and also, the rotation angle of the cam orientation changing part needs to be controlled precisely when changing the orientation of the cams.

The present invention solves these problems, and aims to provide a simple-structured cam clutch that does not require precise control and is operable with a smaller drive force and less prone to damage on cam surfaces or inner and outer raceways.

The present invention achieves the above object by providing a cam clutch including: an inner race and an outer race that are coaxial and rotatable relative to each other; a plurality of cams circumferentially arranged between the inner race and the outer race; a cage member fixed to the inner race or the outer race not to rotate and supporting the plurality of cams; and a selector capable of changing an orientation of the cams, the selector including a driven part allowing a rotation angle thereof to be controlled relative to the inner race or the outer race to which the cage member is fixedly attached, and a selector body circumferentially displaceable relative to the driven part in a resilient manner, the selector body including a cam orientation control protrusion capable of changing the orientation of the cams by making contact with the cams.

According to the invention set forth in claim 1, the selector includes a driven part allowing a rotation angle thereof to be controlled relative to the inner race or the outer race to which the cage member is fixedly attached, and a selector body circumferentially displaceable relative to the driven part in a resilient manner, which obviates the need of precise control of the rotation angle of the driven part.

The resilient displacement reduces any remaining torque of the clutch so that the torque required for the control of cam orientation is kept under a preset torque value. The clutch thus requires only a small drive force and suffers less damage to the cam surfaces and raceways of the inner and outer races.

According to the configuration set forth in claim 2, a resilient circumferential displacement can be realized with a simple structure.

According to the configuration of the invention set forth in claim 3, one of the selector body and the driven part has a circumferentially elongated hole, and the other has a positioning pin that fits into the hole to restrict a displacement angle between the selector body and the driven part. The amount of deformation of the resilient component is thus restricted within a preset range, so that deflection or twist caused by excessive deformation of the resilient component is prevented and the selector durability is improved.

According to the configuration set forth in claim 4, the cam orientation control protrusion is disposed to be able to make contact with the cams at a different axial position from that of a point of contact between a cam surface of the cams and the inner race or the outer race. This enables setting of a large switching angle of the selector as well as obviates the need of precise control of the angle, which ensures reliable switching operation free of various dimensional tolerances or control errors.

According to the configuration set forth in claim 5, a plurality of sets of the inner race, outer race, cams, and cage member are provided along a direction of rotation axis with the selector between the sets, and the selector has one selector body each for each set of the cams on both sides in the direction of rotation axis. A single selector can thus control the operation of the cam clutches on both sides by being driven to respective rotated positions, i.e., the cam clutch can be switched to multiple modes by a simple configuration.

DESCRIPTION OF THE PREFERRED EMBODIMENTS

Figure 1:
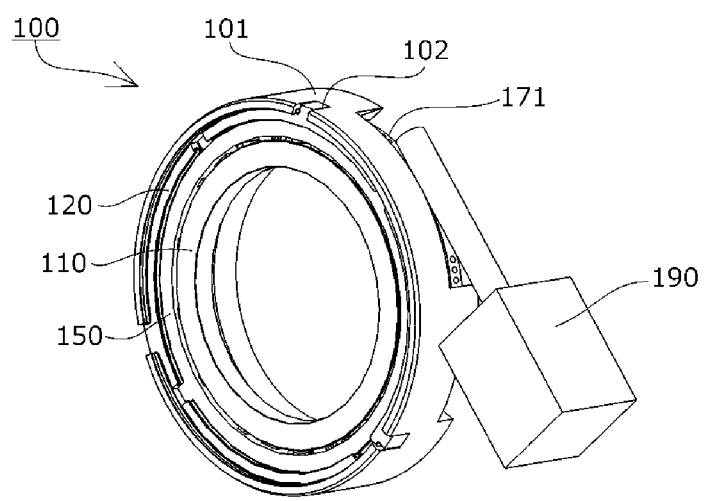
FIG. 1 is a perspective view of a cam clutch according to a first embodiment of the present invention.
Figure 2:
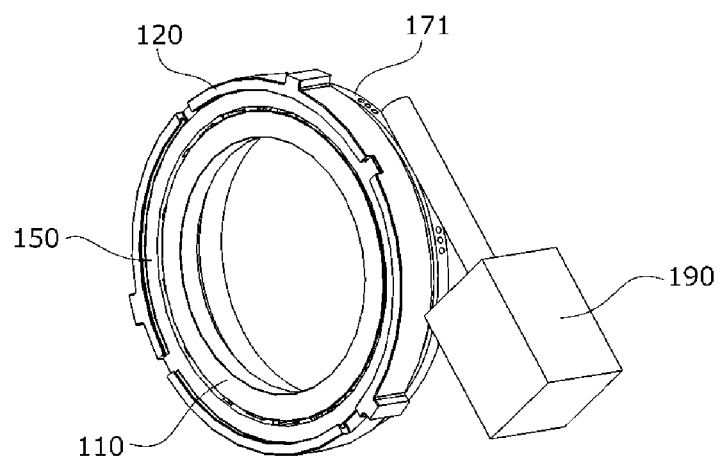
FIG. 2 is a perspective view of the cam clutch shown in FIG. 1 without the case.
Figure 3:
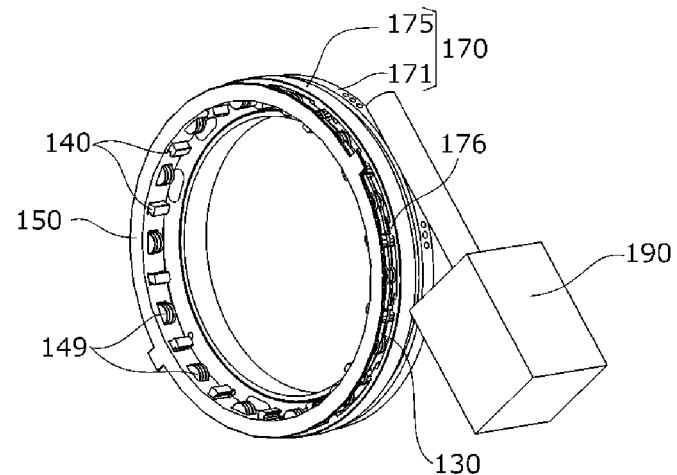
FIG. 3 is a perspective view of the cam clutch shown in FIG. 2 without the inner race and outer race.
Figure 4:
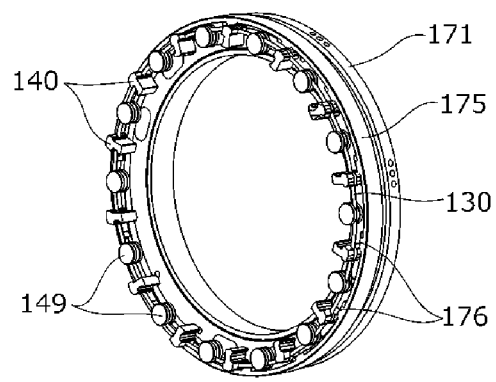
FIG. 4 is a perspective view of the cam clutch shown in FIG. 3 without the cage and actuator.
Figure 5:
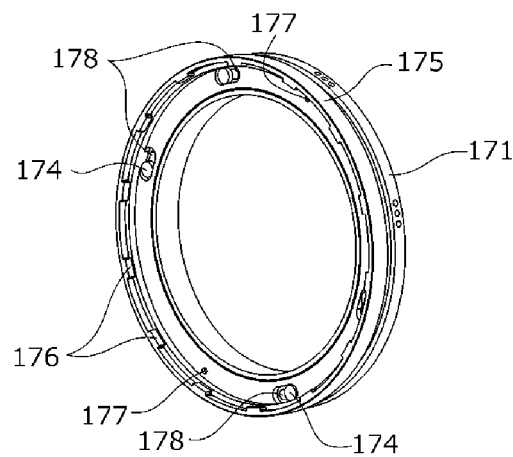
FIG. 5 is a perspective view of the selector of the cam clutch shown in FIG. 1.
Figure 6:
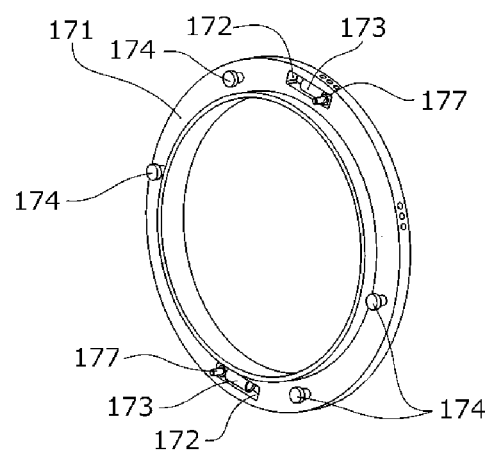
FIG. 6 is a perspective view of a driven part of the selector shown in FIG. 5.
Figure 7:
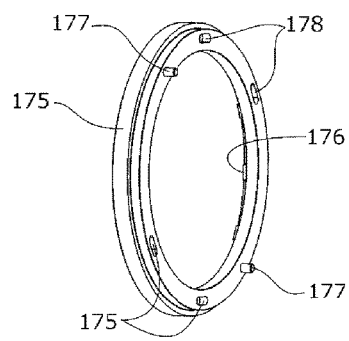
FIG. 7 is a perspective view of the selector body of the cam clutch according to the first embodiment of the present invention viewed from a different direction.
Figure 8:
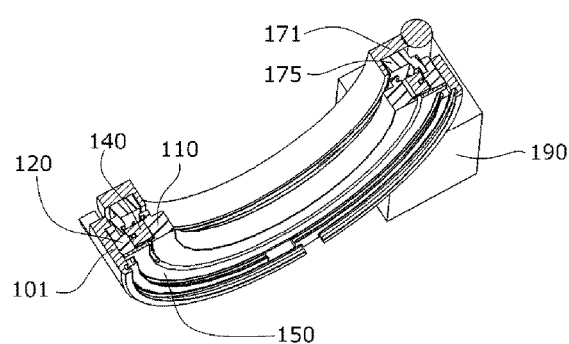
FIG. 8 is a perspective view with a cross section of the cam clutch according to the first embodiment of the present invention.
Figure 9:
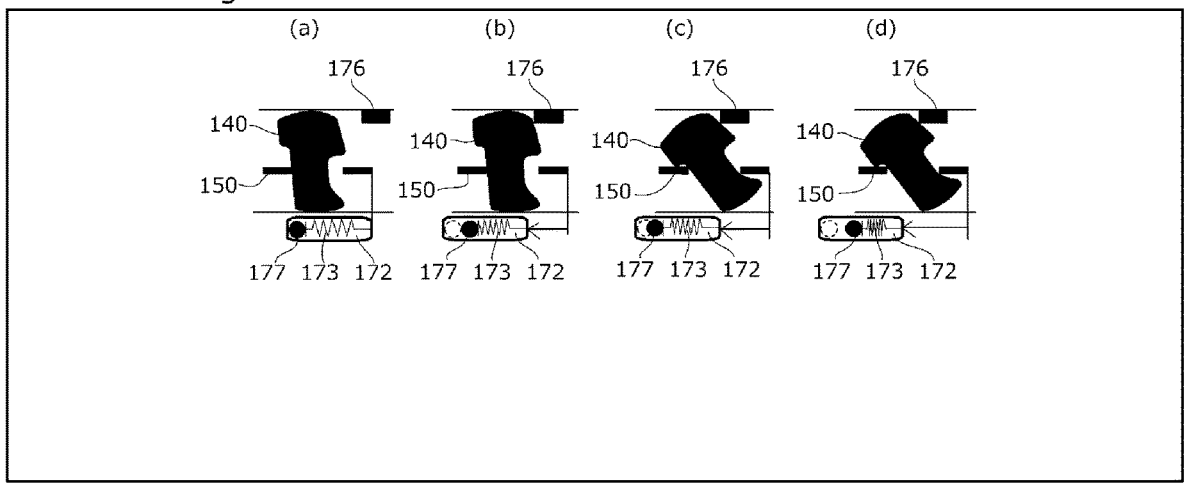
FIG. 9A to FIG. 9D are diagrams explaining the operation of the cam clutch of the present invention.

Embodiments of the present invention are described with reference to FIG. 1 to FIG. 11. Note, however, the present invention is not limited to these embodiments.

Embodiment 1

The cam clutch 100 according to a first embodiment of the present invention includes, as shown in FIG. 1 to FIG. 8, an inner race 110 and an outer race 120 that are coaxial and rotatable relative to each other, a plurality of cams 140 that transmit and interrupt drive force between the inner race 110 and the outer race 120, a cage member 150 that is fixed to the outer race 120 so as not to rotate and supports the plurality of cams 140, and a selector 170 allowing a rotation angle thereof to be controlled relative to the outer race 120 and having cam orientation control protrusions 176 that make contact with cam surfaces of the cams 140 and are able to change the orientation of the cams 140.

The cam clutch further includes a plurality of rollers 149 as spacer members between the inner race 110 and the outer race 120, disposed such as to roll on the outer circumferential surface of the inner race 110 and on the inner circumferential surface of the outer race 120. The cage member 150 supports each of the plurality of cams 140 and the plurality of rollers 149 on the same circumference at predetermined circumferential intervals.

The plurality of cams 140 and rollers 149 are biased toward the inner race 110 by a biasing means 130.

The spacer members may be block members disposed such as to make sliding contact with the outer circumferential surface of the inner race 110 and the inner circumferential surface of the outer race 120. The spacer members may be fixed to the cage member 150, or may be formed integrally to the cage member 150. The spacer members need not necessarily be provided.

In this embodiment, a case 101 is provided around the outer race 120. The outer race 120 is engaged with anti-rotation notches 102 of the case 101 to be fixed in the circumferential direction relative to the case 101.

The cage member 150 is engaged with the outer race 120 and fixed in the circumferential direction relative to the outer race 120.

The selector 170 includes a driven part 171 whose rotation angle is adjustable, and a selector body 175 circumferentially displaceable relative to the driven part 171 in a resilient manner by means of a spring-loaded mechanism.

The selector body 175 includes cam orientation control protrusions 176 capable of changing the orientation of the cams 140 by making contact with the cams 140.

The spring-loaded mechanism includes a resilient component accommodating portion 172 provided to the driven part 171, a spring 173 set inside the resilient component accommodating portion 172, and a compression pin 177 provided to the selector body 175 and inserted into the resilient component accommodating portion 172.

The cam orientation control protrusions 176 are disposed to be able to make contact with the cams 140 at a different axial position from that of the point of contact between the cam surface of the cams 140 and the outer race 120.

In this embodiment, the cams 140 are configured such that the cam surface facing the outer race 120 makes contact with the inner circumferential surface of the outer race 120 in substantial part along the direction of rotation axis, and makes contact with the cam orientation control protrusions 176 of the selector body 175 in part along the direction of rotation axis.

The driven part 171 of the selector 170 is driven and rotated by an actuator 190 and configured to allow its rotation angle to be controlled relative to the outer race 120.

The cams 140 are disposed such that the radially inner cam surface entirely faces the outer circumferential surface of the inner race 110, and the radially outer cam surface mostly faces the inner circumferential surface of the outer race 120 while being able to partly contact the cam orientation control protrusions 176 of the selector body 175.

The actuator 190 that drives and rotates the case 101 and the driven part 171 of the selector 170 is fixed to a stationary portion (not shown) so that the rotation angle of the driven part 171 of the selector 170 relative to the outer race 120 and cage member 150 is controlled by the actuator 190.

The selector body 175 has circumferentially elongated holes 178, and the driven part 171 has positioning pins 174 that fit into the holes 178 to restrict the displacement angle between the selector body 175 and the driven part 171. The holes and pins guarantee the coaxial rotation of the selector body 175 and driven part 171 and minimize deflection and twist caused by deformation of the springs 173 set inside the resilient component accommodating portions 172.

The cam clutch 100 according to this embodiment is switched between a free mode that allows relative rotation between the inner race 110 and outer race 120 in both directions and a locked mode that prohibits relative rotation between the inner race 110 and outer race 120 in one direction by a change in the rotation angle of the driven part 171 of the selector 170.

The switching action from the locked mode to the free mode will be described with reference to FIG. 9A to FIG. 9D.

In the locked mode, the cam orientation control protrusions 176 are at the waiting position away from the cams 140 as shown in FIG. 9A.

The transition to the free mode is achieved by rotation of the driven part 171 of the selector 170 relative to the cage member 150, i.e., the resilient component accommodating portion 172 moving leftward in the drawing and shifting the compression pin 177 leftward via the spring 173, thereby causing the cam orientation control protrusion 176 of the selector body 175 of the selector 170 to push the side face of the cam 140 leftward.

During this movement, the spring 173 is compressed as shown in FIG. 9B if the cam 140 is still transmitting torque. The driven part 171 can move without being hindered, and the selector body 175 stops the movement when the cam orientation control protrusion 176 makes contact with the side face of the cam 140.

As the torque load on the cam 140 reduces, or as the compression force of the spring increases, the cam orientation control protrusion 176 pushes the side face of the cam 140 as shown in FIG. 9C and disengages the cam. The cam 140 is thus locked to the orientation disengaged from the outer circumferential surface of the inner race 110 and the inner circumferential surface of the outer race 120, so that the cam clutch is in the free mode where the inner race 110 is allowed to rotate in both directions relative to the outer race 120.

A further movement of the driven part 171 from the state of FIG. 9C is absorbed by the compression of the spring 173 as shown in FIG. 9D. Therefore, the cam orientation control protrusion 176 does not push the side face of the cam 140 more than the level required for changing the orientation of the cam 140. Namely, precise control of the rotation angle of the driven part 171 is not necessary to stop the selector.

In this embodiment, the driven part 171 is provided with two resilient component accommodating portions 172 and four positioning pins 174, these substantially equally spaced at six locations in the circumferential direction. The number and arrangement of these components may be suitably set.

The cam orientation control protrusions 176 are protruded from the selector body 175 toward the center such as to make contact with only part of the cams 140, and arranged such as to make contact with the cams 140 at a different axial position from that of the contact point between the cam surface of the cams 140 and the outer race 120. This configuration allows integral formation of the cam orientation control protrusions 176 with the selector body 175 and makes the production easy. Alternatively, the cam orientation control protrusions may be formed in the form of pins protruding from the selector body 175 such as to make contact with the cams 140 over the entire surface in the axial direction.

Embodiment 2

Figure 10:
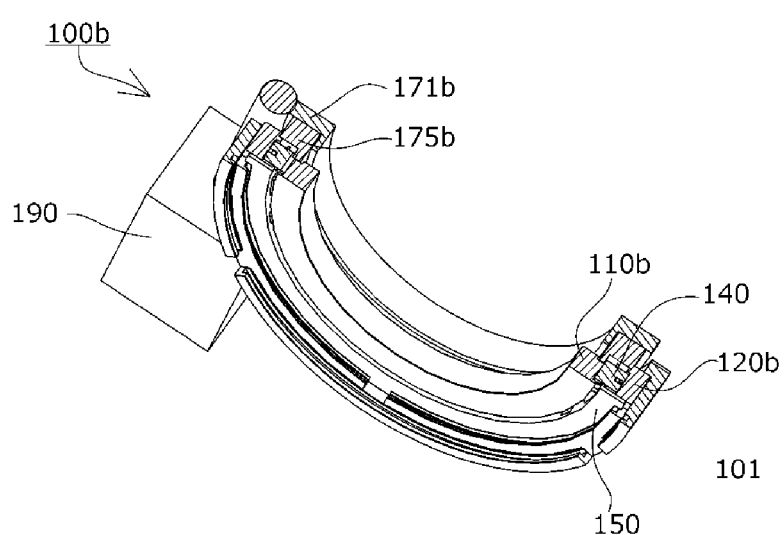
FIG. 10 is a perspective view with a cross section of the cam clutch according to a second embodiment of the present invention.

In the cam clutch 100b according to a second embodiment of the present invention, as shown in FIG. 10, the selector body 175b has cam orientation control protrusions configured to be able to change the orientation of the cams 140 by making contact with the cams 140 on the side facing the inner race 110. The cam surface of the cams 140 on the side facing the inner race 110b is configured to make contact with the outer circumferential surface of the inner race 110b in a substantial part along the direction of the rotation axis, and to make contact with the cam orientation control protrusions of the selector body 175b in part along the axial direction.

Other configurations of the cam clutch are similar to those of the first embodiment.

Embodiment 3

Figure 11:
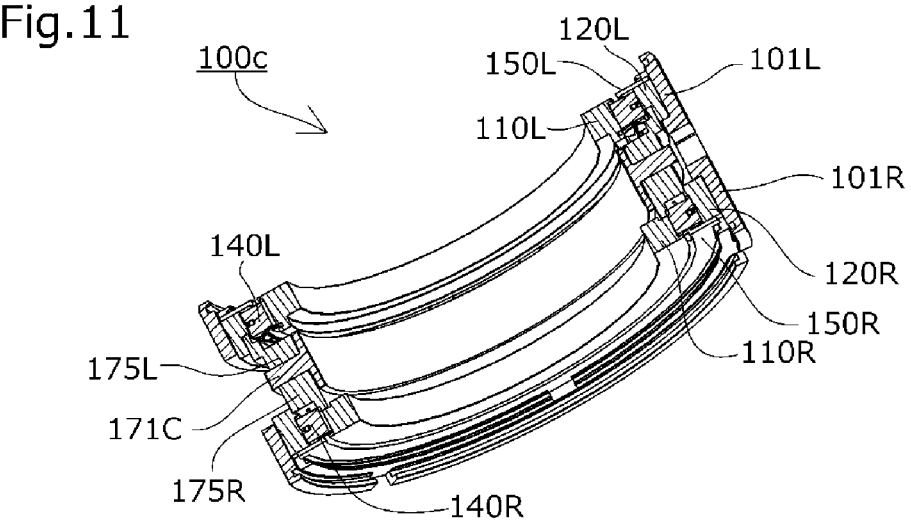
FIG. 11 is a perspective view with a cross section of the cam clutch according to a third embodiment of the present invention.

The cam clutch 100c according to a third embodiment of the present invention includes, as shown in FIG. 11, inner races 110L and 110R, outer races 120L and 120R, a plurality of cams 140L and 140R, and cage members 150L and 150R, disposed on both sides in the axial direction of the driven part 171C of the selector. The selector has selector bodies 175L and 175R, each provided for each of the cams on both sides in the axial direction.

In this embodiment, the selector body 175L in the upper left of the drawing has cam orientation control protrusions configured to be able to change the orientation of the cams 140L by making contact with the cams 140L on the side facing the outer race 120L similarly to the first embodiment. The cam surface of the cams 140L on the side facing the outer race 120L is configured to make contact with the inner circumferential surface of the outer race 120L in a substantial part along the direction of the rotation axis, and to make contact with the cam orientation control protrusions of the selector body 175L in part along the axial direction.

The selector body 175R in the lower right of the drawing has cam orientation control protrusions configured to be able to change the orientation of the cams 140R by making contact with the cams 140R on the side facing the inner race 110R similarly to the second embodiment. The cam surface of the cams 140R on the side facing the inner race 110R is configured to make contact with the outer circumferential surface of the inner race 110R in a substantial part along the direction of the rotation axis, and to make contact with the cam orientation control protrusions of the selector body 175R in part along the axial direction.

The selector bodies 175L and 175R are moved in opposite directions to bring the cams 140L and 140R to the free mode. Therefore, the two sets of cams are switchable to the free mode independently by rotation of the driven part 171C of the selector in forward and reverse directions.

While embodiments of the present invention have been described above in detail, the present invention is not limited to the embodiments described above. Various design changes may be made without departing from the scope of the claims set forth in the claims.

The actuator 190 illustrated in the embodiments described above is supposed to be a motor with a worm drive that engages with the outer periphery of the driven part 171, 171b, or 171C. The actuator may have any configuration as long as it drives the driven part 171, 171b, or 171C to rotate relative to the outer race 120, 120b, 120L, or 120R.

What is claimed is:

1. A cam clutch comprising:
an inner race and an outer race that are coaxial and rotatable relative to each other;
a plurality of cams circumferentially arranged between the inner race and the outer race;
a cage member fixed to the inner race or the outer race not to rotate and supporting the plurality of cams; and
a selector capable of changing an orientation of the cams, the selector including a driven part allowing a rotation angle thereof to be controlled relative to the inner race or the outer race to which the cage member is fixedly attached, and a selector body circumferentially displaceable relative to the driven part in a resilient manner by a spring-loaded mechanism,
the selector body including a cam orientation control protrusion capable of changing the orientation of the cams by making contact with the cams.

2. The cam clutch according to claim 1, wherein the spring-loaded mechanism includes a resilient component accommodating portion provided to one of the selector body and the driven part, and a compression pin provided to an other one of the selector body and the driven part and inserted into the resilient component accommodating portion.

3. The cam clutch according to claim 1, wherein one of the selector body and the driven part has a circumferentially elongated hole, and an other one of the selector body and the driven part has a positioning pin that fits into the elongated hole to restrict a displacement angle between the selector body and the driven part.

4. The cam clutch according to claim 1, wherein the cam orientation control protrusion is disposed to be able to make contact with the cams at a different axial position from that of a point of contact between a cam surface of the cams and the inner race or the outer race.

5. The cam clutch according to claim 1, comprising a plurality of sets of the inner race, outer race, cams, and cage member along a direction of rotation axis with the selector between the sets,
    the selector having one selector body each for each set of the cams on both sides in the direction of rotation axis.

\* \* \* \* \*